United States Patent [19]
Knapp

[11] 3,808,956
[45] May 7, 1974

[54] PISTON ASSEMBLY
[76] Inventor: Peter A. Knapp, 17 Albany St., Wollaston, Mass. 02111
[22] Filed: Nov. 29, 1972
[21] Appl. No.: 310,478

[52] U.S. Cl............. 92/172, 29/156.5, 92/244, 92/260
[51] Int. Cl............................. F16j 1/12
[58] Field of Search ............ 92/172, 258, 260, 231, 92/244, 255, 257; 29/156.5, 525; 403/273, 345, 360

[56] References Cited
UNITED STATES PATENTS
| | | | |
|---|---|---|---|
| 1,216,218 | 2/1917 | Eddowes | 92/260 |
| 2,752,668 | 7/1956 | Sheen | 92/231 X |
| 3,190,191 | 6/1965 | Leman | 92/255 X |
| 3,636,824 | 1/1972 | Clark | 92/249 |

FOREIGN PATENTS OR APPLICATIONS
69,680  3/1952  Netherlands................... 92/244

Primary Examiner—Irwin C. Cohen
Attorney, Agent, or Firm—Chittick, Thompson & Pfund

[57] ABSTRACT

A piston assembly for use in a hydraulic or pneumatic cylinder which has a piston mounted on a piston rod. The piston rod has a stud at its end, and the piston is axially bored and has a countersunk socket. The piston is assembled under heavy pressure onto the piston rod stud and over the end of the piston rod with a force fit. The piston has a second countersunk socket at its head end, and an apertured disc is assembled into this socket and onto the piston rod stud with a force fit. The disc is also welded to the stud.

9 Claims, 1 Drawing Figure

PATENTED MAY 7 1974  3,808,956
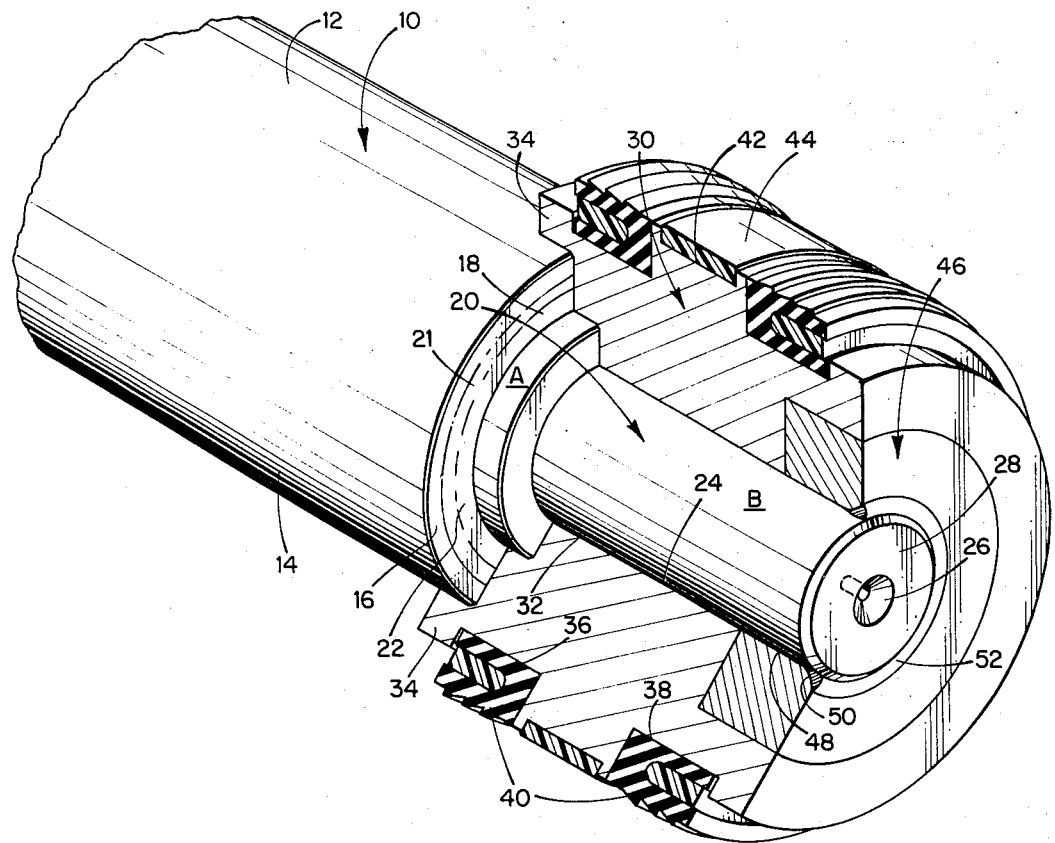

PISTON ASSEMBLY

BACKGROUND OF THE INVENTION

This invention finds utility in refuse collecting vehicles, but also finds equal use in hydraulic or pneumatic cylinders employed in other equipment. Typically, rear end loading refuse collecting vehicles of the type shown in U.S. Pat. No. 3,661,281 issued May 9, 1972 to Herpich, et al. employ a plurality of hydraulic cylinders to drive packing and carrying blades through lengthy trash carrying motions. In these motions, the hydraulic cylinders extend their piston rods a considerable distance with the consequence that large lateral and longitudinal forces are applied to the extended piston rods. Over lengthy periods of use, the lateral forces cause the piston rods to break or crack at the point where they are joined to the piston. The longitudinal forces cause the piston to strip the threads off of the piston rod stud. Breakage of the piston rod often severely damages the cylinder with the result that not only must the piston rod be replaced, but also the piston and the cylinder must be replaced. Replacement or repair of these parts is expensive and extremely time-consuming.

Therefore, a need exists for a piston assembly which will reduce the likelihood of breakage or damage to the piston rod and the piston, even under conditions in which great lateral and/or longitudinal forces are exerted on the piston rod. Furthermore, a need exists for a piston assembly which can be used as a replacement unit when thread strippage occurs. Also, a need exists to eliminate the conventional requirement for the use of an O-ring between the piston and the piston rod.

SUMMARY OF THE INVENTION

In order to fulfill these needs, this invention provides an assembly consisting of a piston rod having a stud at one end onto which a piston and a disc are mounted. The piston and disc are assembled under high pressure onto the piston rod with a force fit, and the disc is also welded onto the rod stud.

By this arrangement, the piston does not have to be threaded and retainably pinned onto the piston rod, and an O-ring between the piston and piston rod is no longer necessary. Preferably, the piston is made of a lightweight aluminum alloy which reduces the piston inertia that must be overcome during cylinder operation.

DESCRIPTION OF THE DRAWINGS

The FIGURE is a perspective view of the piston assembly, partly broken away to show the piston rod, the piston and the apertured disc.

DESCRIPTION OF THE PREFERRED EMBODIMENT

The piston assembly of this invention is shown in the single FIGURE of the drawings. It operates within an unshown hydraulic or pneumatic cylinder which is closed at the piston end and which has an opening at the other end through which the piston rod is reciprocated. Power for extending and retracting the piston rod is produced by a pumping system which drives hydraulic fluid or air through lines opening into the cylinder on both sides of the piston. Control of the piston rod extension is provided by selectively actuated valves. This arrangement is conventional and it is solely the piston assembly located within the cylinder which is the subject of this invention.

In the FIGURE, piston rod 10 is a tubular rod which is customarily hollow, although alternatively it could be solid. Preferably, piston rod 10 is steel and has a relatively long tubular portion 12 (shown broken away) which extends and reciprocates through the cylinder opening. Typically, the unshown free end of tubular portion 12 is linked to and drives a pivot arm or other load-carrying element.

Tubular portion 12 of piston rod 10 has curved cylindrical sides 14 which are perpendicular to the rod's flat end wall 16. The open end of hollow tubular portion 12 is plugged by the cylindrical base 18 of piston rod stud 20. Stud base 18 is preferably welded along line 21 to tubular portion 12 and the weld is then ground flush so that flat end wall 16 of the tubular portion becomes smoothly contiguous with and in planar alignment with the flat end wall 22 of stud base 18.

Stud 20 has a relatively short length and extends coaxially from and beyond the flat end wall 16 of piston rod tubular portion 12. The stud has smooth cylindrical sides 24 and has a small countersunk indentation 26 in its flat head 28 at the point where it was mounted for rotation during forming. Preferably, that portion of stud 20 which extends beyond end wall 16 of tubular portion 12 is formed in the shape of two contiguous coaxial cylinders having unequal diameters, the larger diameter cylinder A being located adjacent to end wall 16 and the smaller diameter cylinder B extending in the other direction. Usually stud base 18, larger diameter cylinder A, and smaller diameter cylinder B are formed by being machined from a single bar of steel stock.

A piston 30 is formed by casting or by machining from a single bar of stock, preferably of non-ferrous metal such as aluminum or aluminum alloy. The piston has a generally cylindrical shape and a smooth axial bore 32 that has a diameter which is very slightly smaller than the diameter of stud cylinder B. The leading shoulder edges of the tubular portion, stud cylinder A and stud cylinder B are all slightly beveled to facilitate the subsequent assembly of parts operation.

Piston 30 is formed with a countersunk socket at its piston rod end, including a substantial peripheral lip or flange 34. The concave configuration of this flanged socket is precisely matched to and has a very slightly smaller diameter than the convex configuration of the tubular portion of piston rod 10 and the larger diameter stud cylinder A. Piston 30 is mounted onto the piston rod 10 by being assembled thereon with a force fit by the use of very heavy pressure. The piston is pressed over the cylindrical sides 24 of stud cylinder B, then over the cylindrical sides of stud cylinder A, and then over the cylindrical sides 14 of tubular portion 12. Socket flange 34 fits over and around the cylindrical sides of tubular portion 12 and provides considerable support to resist lateral forces applied against piston rod 10.

The recommended force fit of the pressure assembly is one with approximately 0.0005d average interference of metal (American Standards Association—Class 7). This force fit is extremely tight and long lasting, especially when the piston is aluminum alloy and the piston rod and stud are steel. After assembly, all interior surfaces of the socket are in complete face to face contact with all of the mating surfaces of the tubular portion 12 and stud cylinder A. This helps to prevent unwanted fluid leakage from one side of the piston to the other side.

If the stud is formed as a single cylinder instead of as two contiguous cylinders, the concave configuration of the rod end piston socket will be modified to be precisely matched to and to have a slightly smaller diameter than the convex configuration of the tubular portion of piston rod 10 and the single piston rod stud cylinder. In either case, the flanged rod end piston socket is shaped to be assembled with a force fit over the cylindrical sides 14 of tubular portion 12 of piston rod 10 and over the cylindrical sides of the stud.

It will be understood that this invention is not limited to any specific class of force fit between the piston 30 and the piston rod 10. By "force fit", applicant intends to define a fit between two assembled parts which have no relative clearance, and which preferably have significant relative interference, so that heavy pressure is required to assemble these parts and, after assembly, the parts are considered to be permanently assembled.

The piston 30 as shown in the drawings has three circumferential spaced grooves. Grooves 36 and 38 carry fluid seals 40 to prevent fluid from passing between the cylindrical sides of the piston and the cylinder walls. Good results have been achieved with seals made of Neoprene rubber. The third groove 42, located intermediate the other two grooves, carries a wear strip 44 made of a plastic material, such as polyvinyl chloride.

Piston 30 is formed with a second countersunk socket at its head end, i.e., the end facing away from the main portion of the piston rod 10. The concave configuration of this head end socket is precisely matched to and has a slightly smaller diameter than the convex configuration of an apertured disc 46 which is shaped and sized to fit therein.

Apertured disc 46 has an annular shape with a substantially square cross-section. It is preferably made of steel and its bore has cylindrical interior walls 48 which have a very slightly smaller diameter that the diameter of stud cylinder B. Disc 46 is mounted onto the piston rod 10 by being assembled thereon with a force fit by the use of heavy pressure. The disc is pressed over the cylindrical sides 24 of stud cylinder B and into the cylindrical interior side walls of the head end socket of piston 30. After assembly, all interior surfaces of the socket are in complete face to face contact with all of the mating surfaces of apertured disc 46. This prevents unwanted fluid leakage between the piston and the disc.

The trailing aperture edge 50 of disc 46 is beveled and the final assembly step is to arc weld the disc to the end of piston rod stud 20. Weld 52 assists in retaining the disc on the piston rod and also assists in preventing fluid from leaking between the disc and the piston rod stud.

After the described pressure assembly and welding operations have been completed, the piston assembly provides a lightweight, extremely strong piston assembly which requires no O-rings or threaded piston engagement. It is very resistant to breaking under lateral force loading applied to the extended piston rod, and has no threads to strip under longitudinal force loading.

Finally, the piston assembly of this invention can be alternatively used to repair a damaged conventional piston assembly in which the piston rod still has or can be refabricated to have a usable stud. In these situations, the stud is machined smooth so that it achieves the shape shown in the drawing. Then, the piston 30 and the disc 46 are assembled onto the stud and tubular rod portion with a force fit in the manner previously described. Thus, this invention can be employed as original equipment or as a replacement part assembly depending on the needs of the customer.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A piston assembly for use in a hydraulic or pneumatic cylinder comprising:
   a. a piston rod having a relatively long tubular portion with cylindrical sides, said piston rod including a relatively short smooth cylindrical stud, means fixing said stud to said tubular portion so that it extends co-axially from one end of said tubular portion;
   b. a piston mounted on said piston rod, said piston having a generally cylindrical shape and a smooth axial bore, said piston having countersunk sockets at each of its ends, each said socket having cylindrical interior side walls, said piston axial bore being assembled on said piston rod stud and engaged thereto with a force fit, and said rod end piston socket being assembled on and over said piston rod tubular portion and engaged thereto with a force fit; and
   c. an apertured disc mounted on said piston rod to assist in retaining said piston on said piston rod, said disc being assembled on said piston rod stud and within said head end piston socket and engaged thereto with a force fit, and means fixing said disc to the end of said piston rod stud.

2. The piston assembly of claim 1 wherein said rod end socket and said head end socket are each in complete face to face contact with all of the mating surfaces of said tubular portion and said apertured disc, respectively.

3. The piston assembly of claim 1 wherein the principal material constituent of said piston is non-ferrous metal.

4. The piston assembly of claim 1 wherein the principal material constituent of said piston is aluminum.

5. The piston assembly of claim 3 wherein the principal material constituent of said piston rod is ferrous metal.

6. The piston assembly of claim 5 wherein said means fixing said disc comprises a weld.

7. The piston assembly of claim 1 wherein said piston rod stud extending from one end of said tubular portion has the shape of two contiguous co-axial cylinders having unequal diameters, the larger diameter cylinder being located adjacent to said one end of said piston rod tubular portion.

8. The piston rod assembly of claim 7 wherein said rod end piston socket has the shape of two contiguous co-axial cylinders having unequal diameters, the larger diameter cylinder being located adjacent to said one end of said piston rod tubular portion, said rod end piston socket being assembled on said tubular portion of said piston rod and on said larger diameter cylindrical portion of said piston rod stud and engaged thereto with a force fit.

9. The piston assembly of claim 1 wherein the cylindrical sides of said piston have circumferential spaced grooves formed therein, and sealing rings mounted in said grooves to prevent fluid bypass between said piston and the cylinder walls.

* * * * *